United States Patent [19]

Seymour

[11] 4,353,377
[45] Oct. 12, 1982

[54] GUIDE FOR LEAF STRIPPING APPARATUS
[75] Inventor: Shaun A. Seymour, New Holland, Pa.
[73] Assignee: Sperry Corporation, New Holland, Pa.
[21] Appl. No.: 271,318
[22] Filed: Jun. 8, 1981
[51] Int. Cl.³ ........................ A01D 1/00; A01D 45/16
[52] U.S. Cl. .................................. 130/30 R; 56/27.5
[58] Field of Search ............... 56/27.5, 119, 104, 105; 130/30 R; 131/311; 171/28

[56] References Cited

U.S. PATENT DOCUMENTS

| | | | |
|---|---|---|---|
| 1,673,921 | 6/1928 | Sharp | 15/256.51 |
| 2,953,209 | 9/1960 | DeMarco | 171/28 |
| 3,121,247 | 2/1964 | Malicky et al. | 15/256.51 |
| 3,406,506 | 10/1968 | Shriver et al. | 56/27.5 |
| 4,023,331 | 5/1977 | Gregory et al. | 56/27.5 |
| 4,035,998 | 7/1977 | Griner et al. | 56/27.5 |
| 4,165,965 | 8/1979 | Bernardelli et al. | 15/256.51 |
| 4,292,982 | 10/1981 | Butcher | 56/27.5 |
| 4,307,562 | 12/1981 | Seymour et al. | 56/27.5 |

FOREIGN PATENT DOCUMENTS

| | | | |
|---|---|---|---|
| 2165337 | 8/1973 | France | 56/27.5 |
| 2301184 | 9/1976 | France | 56/27.5 |

Primary Examiner—Paul J. Hirsch
Attorney, Agent, or Firm—Darrell F. Marquette; Frank A. Seemar; Larry W. Miller

[57] ABSTRACT

The problems of properly guiding tobacco leaves to the nip of leaf stripping rolls and limiting leaves from sticking to the rolls, are avoided by providing a member which includes a portion having a planar surface for guiding leaves to the nip and which includes a portion extending axially along the rolls for automatically stripping leaves from the moving rolls.

9 Claims, 7 Drawing Figures

GUIDE FOR LEAF STRIPPING APPARATUS

BACKGROUND OF THE INVENTION

This invention relates generally to tobacco and tobacco treatment and, more particularly, to treatment of tobacco leaves such as stripping the leaves from stalks.

A tobacco leaf stripping apparatus of the type using a pair of side-by-side, counter-rotating nip rolls, included a pair of wire guide members for guiding the tobacco leaves to the nip of the rolls to be stripped from a stalk of a tobacco plant.

The wire guides are limited to their ability to properly guide leaves to the nip of the rolls since leaves sometimes fall within the loop formed by the wire guides and thus are not properly fed to the nip of the rolls.

Also, when on occasion a tobacco leaf sticks to one or both of the rolls, the rolls must be stopped and the leaf manually stripped off.

The foregoing illustrates limitations of the known prior art. Thus, it is apparent that it would be advantageous to provide an alternative directed to overcoming one or more of the limitations as set forth above. Accordingly, a suitable alternative is to provide a guide for a leaf stripping apparatus which guides the leaves to the nip of the rolls and, in the event of leaves sticking to the rolls, the guide is capable of automatically stripping the leaves from the rolls.

SUMMARY OF THE INVENTION

In one aspect of the present invention, this is accomplished by providing an apparatus for stripping leaves from a stalk which includes means for supporting the stalk and means operably connected for gripping the stalk and for urging the stalk to move through the stalk support. A device is provided for chopping the stalk adjacent the rear end of the support. A pair of rollers are provided for counter-rotating in side-by-side relationship for forming a nip. Means are provided (a) for guiding leaves to the nip and, in the event that some leaves stick to the rolls, (b) for stripping the sticking leaves from the rolls.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
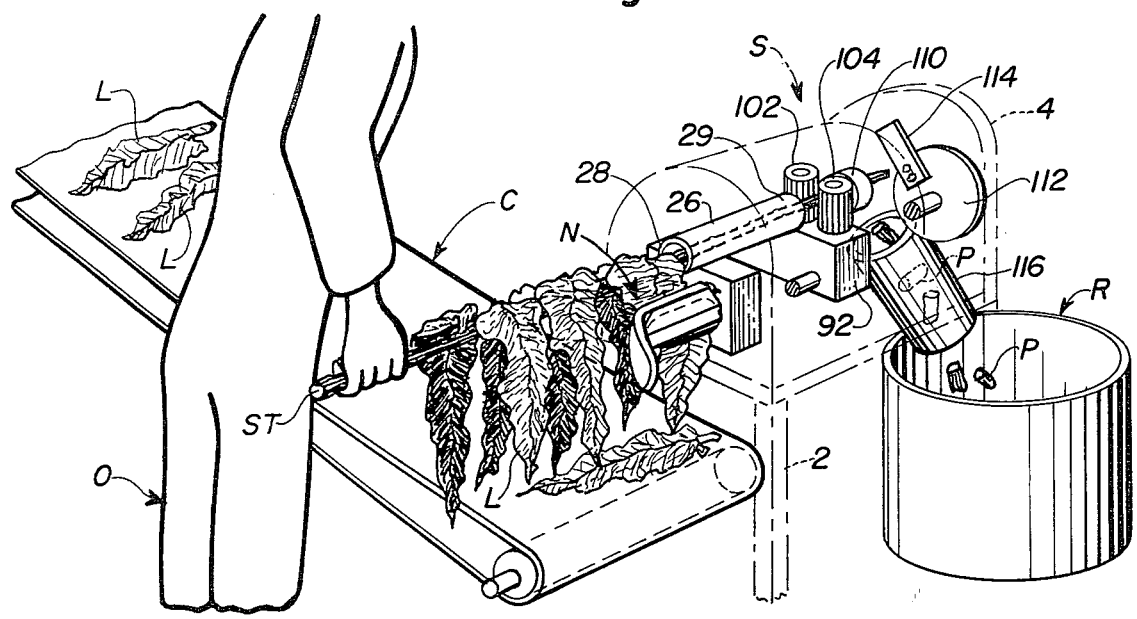
FIG. 1 is an isometric view illustrating an embodiment of a tobacco leaf stripping apparatus.
Figure 2:
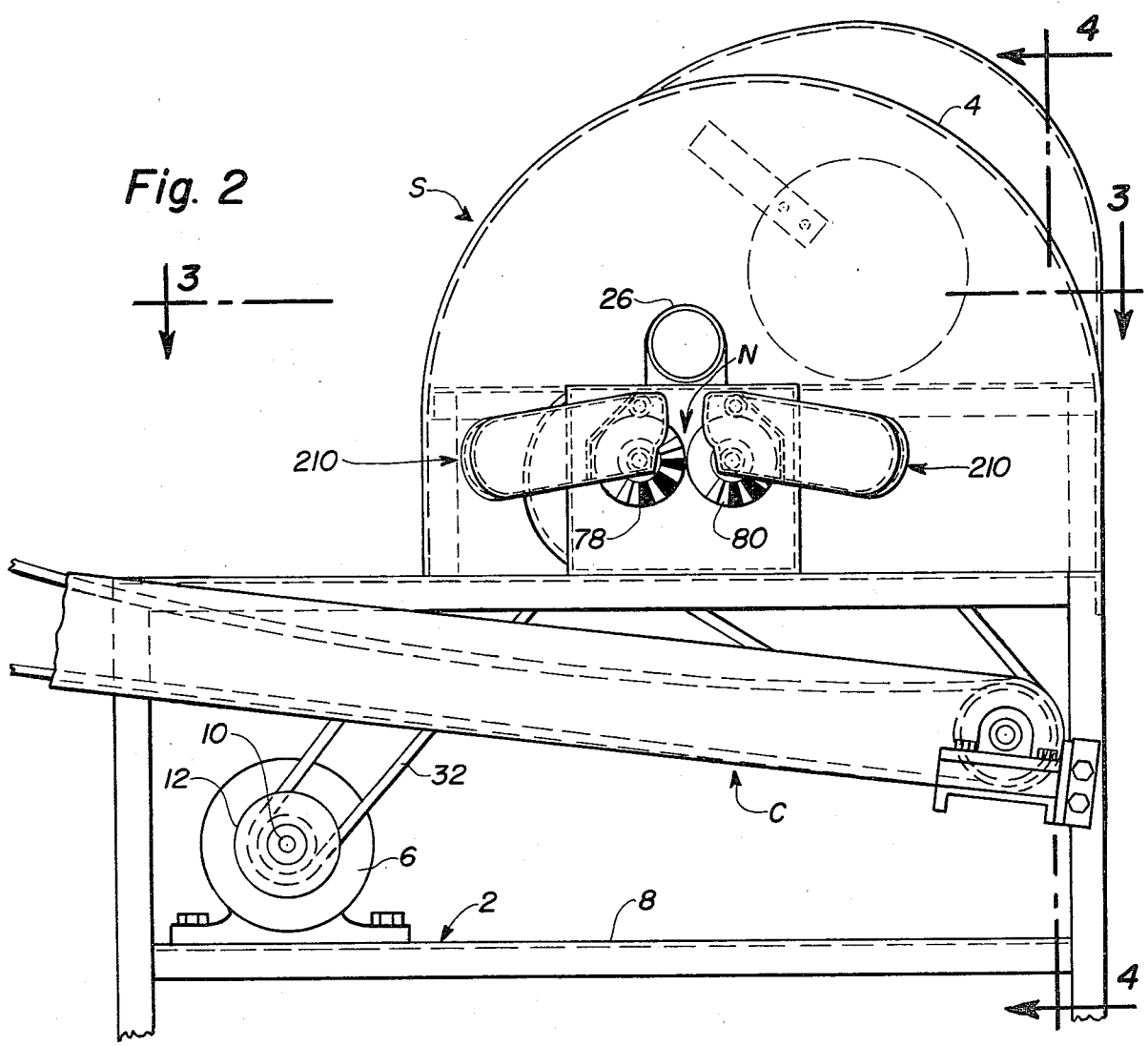
FIG. 2 is a frontal view illustrating a portion of the apparatus of FIG. 1.

The apparatus for leaf stripping comprises in general the main stripping unit S associated with a conveyor C and a receptacle R. A support frame 2 supports the stripping unit S enclosed by a housing 4. A motor 6 is mounted on the support frame 2 and is secured to rails 8. The motor 6 has a drive shaft 10 which powers a pulley member 12.

Rails 8 are parallel to other support rails 14,16 of frame 2. Frame 2 includes cross rails 18 connecting the various rails 8,14 and 16. Frame 2 also is provided with support brackets 20,22,24. Brackets 20 and 22 are provided with journals not shown in detail which may include bearing sleeves. In this manner, provision is made for supporting a stalk supporting means such as a rotatable stalk support tube 26. Tube 26 has a forward end 28 and a rearward end 29. Forward end 28 is preferably threaded onto main support tube 26 and has a knife edge 30. Forward end 28 may be removed for replacement or sharpening of knife edge 30. Means are provided for rotating tube 26 and includes a drive belt 32 riding on a pulley 34 fixed to tube 26. Drive belt 32 is driven from pulley 12.

Figure 3:
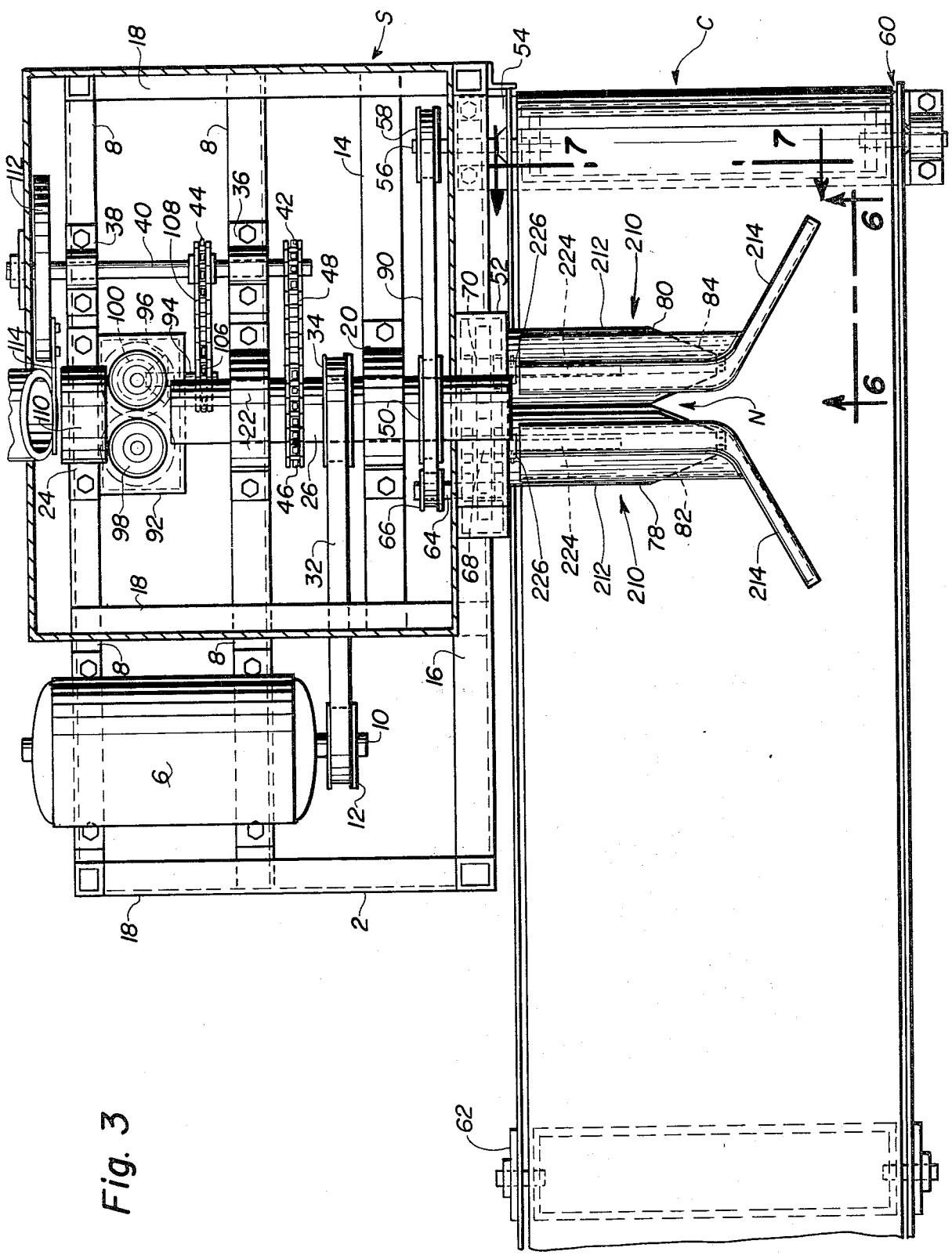
FIG. 3 is a top view illustrating a portion of the apparatus viewed from line 3—3 of FIG. 2.

Support journals 36 and 38 are mounted on rails 8 adjacent support brackets 22,24 and may include bearing support members (not shown). The support journals 36,38 support a rotatable shaft 40 to which a pair of sprockets 42,44 are splined or otherwise fixed thereto. Mounted on stalk support tube 26 is a sprocket 46 which drives a sprocket chain 48 which, in turn, drives sprocket 42 and shaft 40. On the forward portion of tube 26 is a pulley 50. Mounted on support rail 16 is a gear case 52 and a journal support 54. Journalled in the support 54 is a stub shaft 56. A pulley 58 is mounted on the stub shaft 56. The other end of the stub shaft 56 is provided with a conveyor belt drive means 60 for driving the conveyor C. Conveyor idler 62 may be provided as shown in FIG. 3 depending upon the length of the conveyor stem.

Gear case 52 is provided with a stub shaft 64. On stub shaft 64 is mounted a pulley 66 best shown in FIG. 3. The gear case 52 has a pair of stub axles 68,70 on which are splined a pair of gears 72,74. The stub shaft 64 has mounted thereon a drive gear 76 which engages gear 74 to drive the same which in turn drives gear 72. The stub axles 68,70 protrude through the gear case 52 and have mounted thereon, means for stripping leaves L from stalk ST including a pair of leaf stripping rollers 78,80 having conical tips 82,84 at the free end of rollers 78,80. By free end, it meant ends opposite the ends supported by axles 68,70. The rollers rotate forwards each other in a downward direction and are in contact with each other and when rotating form a nip N. The rollers preferably have a friction surface which could include a soft gripping material such as a rubber, plastic or the like though for certain uses it may be preferable to use a hard surface with knurling or the like.

Passing over pulleys 50,58 and 66 is a drive belt 90. Mounted in the housing 4 on one of the rails 8 is a gearbox 92. A stub shaft 94 is mounted for rotation in the gearbox 92 and is provided with a beveled drive gear 96 which drives a pair of meshing gears 98,100 as best shown in FIG. 3. The meshing gears 98,100 in turn drive means for gripping the stalk and for urging the stalk to move through tube 26 which includes a pair of stalk infeeding grippers 102,104. The infeeding grippers 102,104 are shown knurled in FIG. 1 but they can be provided with a series of projecting studs (not shown) having points thereon for gripping purposes. The stub shaft 94 is provided with a sprocket 106. Sprocket drive chain 108 is driven by sprocket 44 to drive sprocket 106. Rearward of the gearbox 92 immediately adjacent the infeed grippers 102,104 is a short tubular member 110 approximating the diameter of the stalk support tube 26. The short tubular member 110 is mounted on the support bracket 24.

Figure 4:
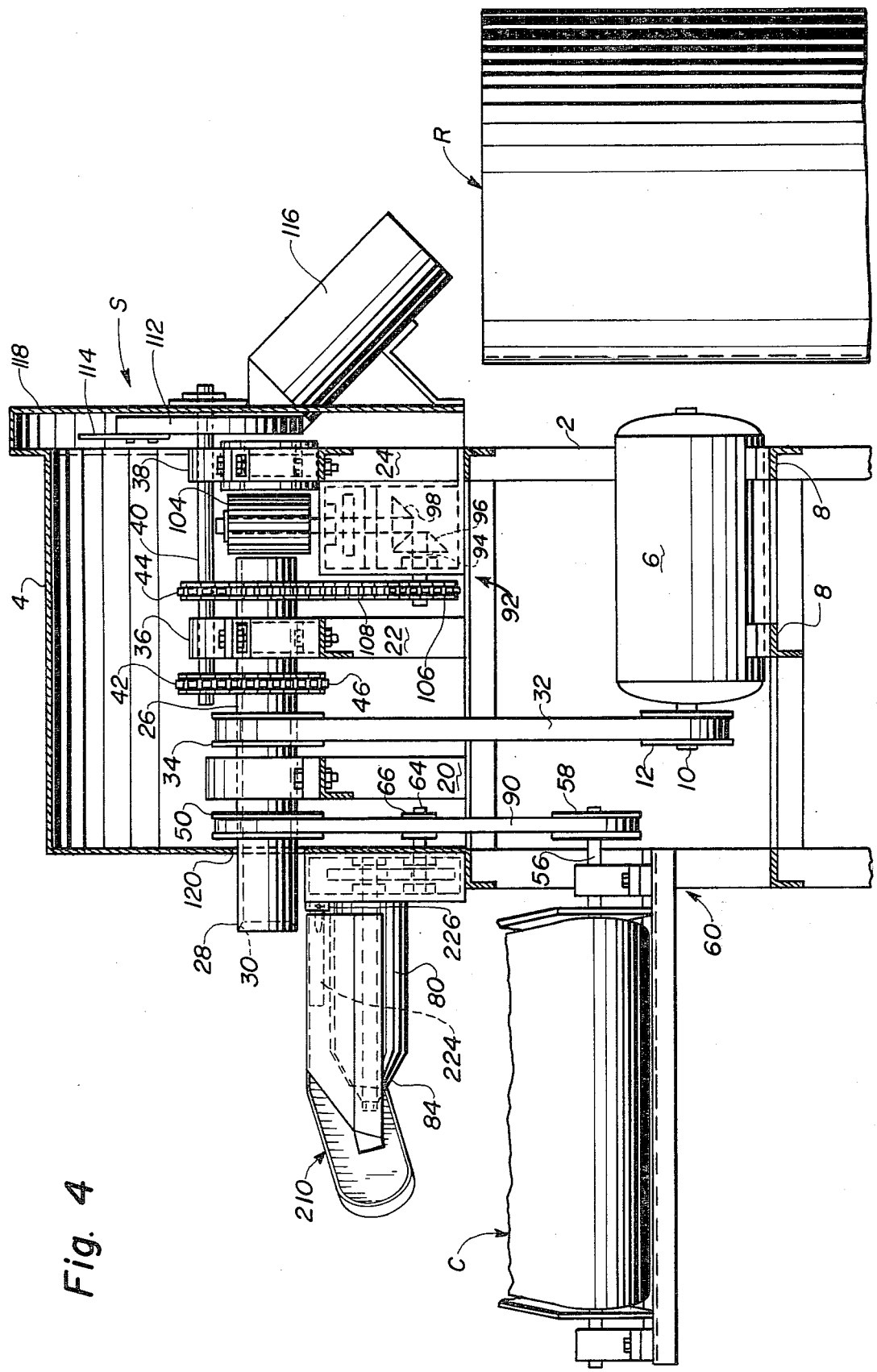
FIG. 4 is a top view illustrating a portion of the apparatus viewed from line 4—4 of FIG. 2.
Figure 5:
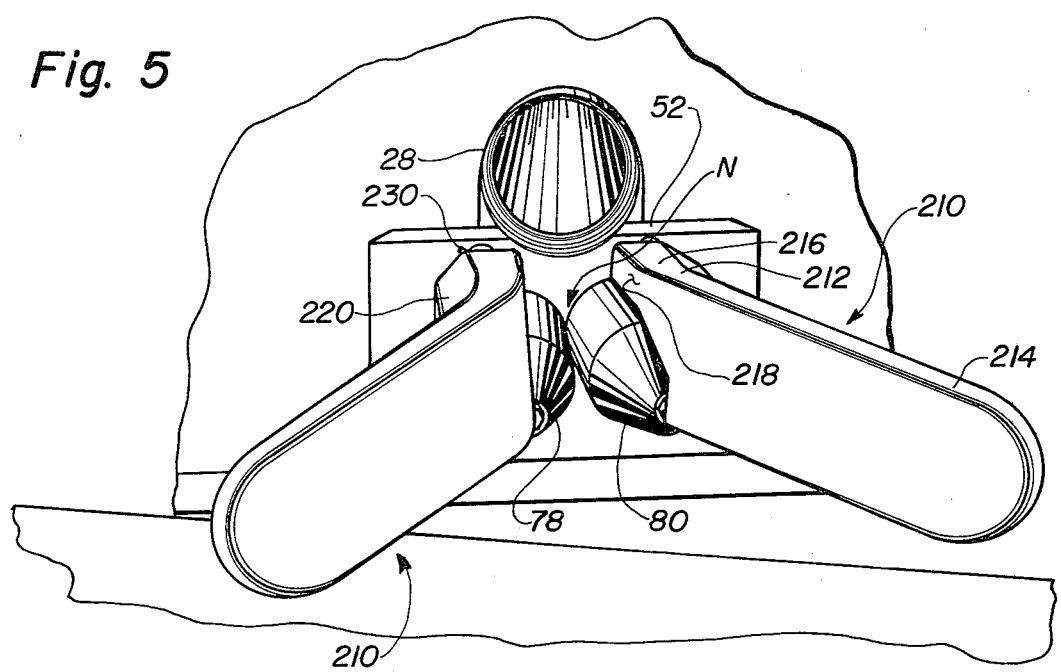
FIG. 5 is another isometric view illustrating a portion of the apparatus of FIG. 1.
Figure 6:
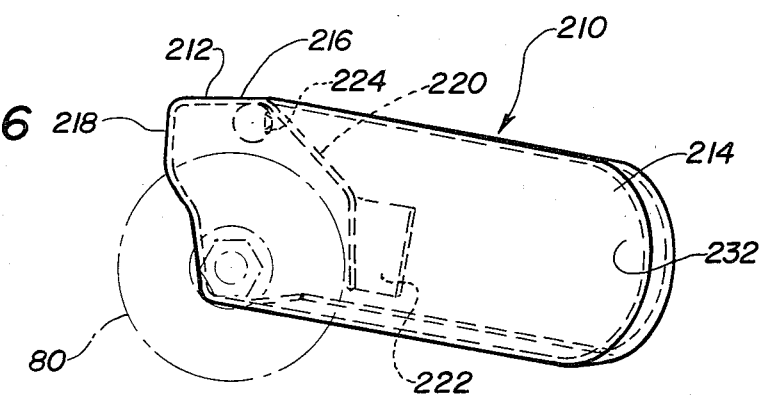
FIG. 6 is an end view illustrating an embodiment of a leaf guide as viewed from line 6—6 of FIG. 3.
Figure 7:
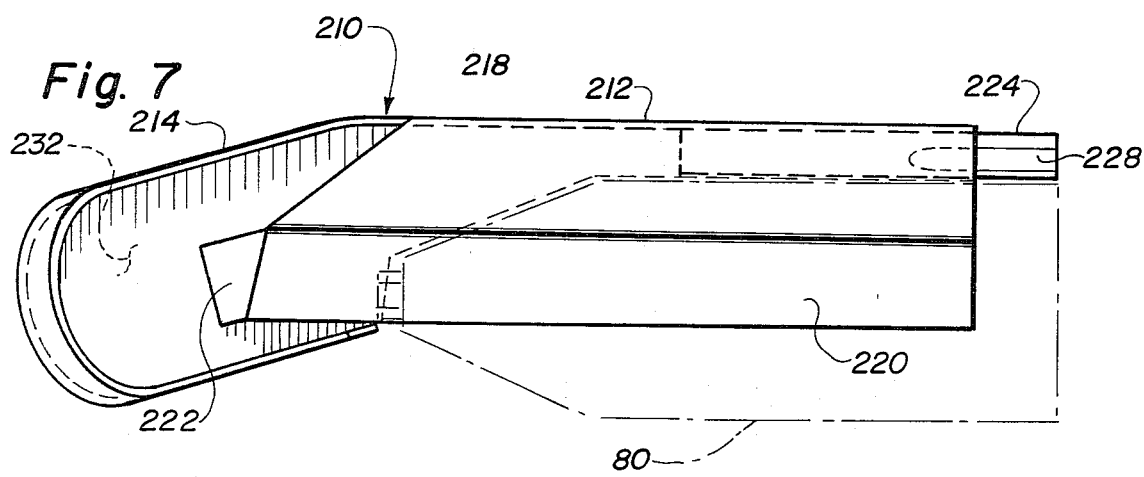
FIG. 7 is a side view illustrating an embodiment of the leaf guide as viewed from line 7—7 of FIG. 3.

The shaft 40 which is supported on journals 36,38 extends beyond the rail 8 and includes means for chopping the stalks adjacent the rearward end 29, such as a flywheel 112 to which is fixed a chopper cutter 114. The knife edge of chopper 114 swings by the end of tubular member 110 and in the area of chopper 114 is positioned a chute 116 which may be welded or otherwise secured to housing 4. The housing 4 should include a shroud 118 as best shown in FIG. 4. Shroud 118 is preferably constructed of heavy duty steel to enclose chopper 114 and flywheel 112.

It will be noted that housing 44 includes a front opening 120 through which the stalk support tube 26 extends. Forward end 28, including knife edge 30 projects from the vicinity of gear case 52. It is important that the leaf stripping rollers 78,80 not extend too far beyond knife edge 30. As shown in FIG. 4, the length of rollers 78,80 is about three times the diameter of stalk support tube 26. It should be further noted that tube 26 is positioned above the nip N and above the top surface of rollers 78,80. The distance above the rollers should approximate the diameter of the stalk support tube 26. Rollers 78,80 should have a diameter from about two inches to about four inches. The diameter of tube 26 should be sufficiently large to carry the largest stalk with a diameter of from two inches to about four inches with a three inch diameter preferred. The distances and dimensions indicated are preferable for tobacco products and it would be obvious that for other leaf products, other dimensions may be preferred.

Means, such as guide members 210, are provided for guiding the leaves to the nip and, in response to some leaves occasionally sticking to the rolls, for stripping the sticking leaves from the rolls. Guide members 210 are each bent and are mounted adjacent the rollers 78,80. Each member 210 preferably fabricated from sheet steel to include a stripping portion 212 and a guiding portion 214.

Stripping portion 212 extends axially along the adjacent roller 78 or 80 and includes an upper arm 216 and a pair of side flanges 218,220 extending downwardly from arm 216 toward the adjacent roller 78 or 80. Flange 218 extends to a position of proximity with adjacent roller 78 or 80 and thus functions as a stripper leg for stripping sticking leaves of tobacco from the rollers, should sticking occur. By proximity is meant, preferably about 1/16 inch clearance between flange 218 and the adjacent roller. The other side flange 220 includes a reinforcing arm 222 extending into welded contact with guiding portion 214. A pin 224 is preferably welded to stripping portion 212 and extends therefrom for engagement with a receptacle 212 and extends therefrom for engagement with a receptacle 226 formed in gear casing 52. A flat surface 228 formed on pin 224 provides for engagement with a set screw 230 for releasably securing pin 224 with gear casing 52.

Guiding portion 214 bends away from the axial extension of stripping portion 212 and includes a planar surface 232 which preferably covers the conical tips 82,84 at the free ends of rollers 78,80. In this manner, a guide member 210 mounted adjacent each roller 78,80 provides a pair of flared guiding portions 214 for guiding leaves to converge toward the nip of rollers 78,80.

With the parts assembled as set forth above it can be seen that operator O guides a stalk ST into the nip N of rollers 78,80. Leaves L are guided by planar surface 232 of guide portion 214 to be stripped by rollers 78,80 and drop to conveyor C. Stalk ST is urged through tube 26 by grippers 102,104 and the stalk is eventually chopped by a chopper 114 into substantially uniform pieces P which travel down chute 116 to a receptacle R. In the event that a leaf L does stock to rollers 78,80, presence of flange 218 in proximity with rollers 78,80 will strip the sticking leaf from the roller.

The foregoing has described a guide for leaf stripping apparatus which guides the leaves to the nip of the rolls and, in the event of leaves sticking to the rolls, strips the sticking leaves from the rolls.

It is anticipated that aspects of the present invention, other than those specifically defined in the appended claims, can be obtained from the foregoing description and the drawings.

Having thus described the invention, what is claimed is:

1. Apparatus for stripping leaves from a stalk comprising:
    (a) means for supporting the stalk, said means having front and rear ends;
    (b) means operably connected for rotating the stalk supporting means;
    (c) means operably connected for gripping the stalk and for urging the stalk to move through the stalk supporting means;
    (d) means adjacent the rear end for chopping the stalk adjacent the rear end of the supporting means;
    (e) means adjacent the front end for stripping leaves from the stalk, said means including a pair of rollers operably connected for counter-rotating in side-by-side relationship for forming a nip, each roller having a free end including a conical tip remote from the apparatus;
    (f) means for guiding the leaves to the nip and, in response to some leaves sticking to the rollers, for stripping the sticking leaves from the rollers; and
    (g) the guiding and stripping means including a bent member adjacent each roller attached to the apparatus adjacent the front end of the support means, each of said bent members having a stripping portion extending axially along the adjacent roller and in proximity therewith and substantially parallel with said nip, and a guiding portion bent for extending divergently outwardly from said nip.

2. The apparatus of claim 1 wherein each bent member covers the free end of the adjacent roller.

3. The apparatus of claim 1 including:
    a pin extending from each bent member, said pin having a flat surface portion.

4. The apparatus of claim 3 wherein the apparatus includes means for receiving each pin.

5. The apparatus of claim 4 including:
    means for releasably securing each pin in said apparatus.

6. The apparatus of claim 1 wherein said guiding portion includes a planar surface.

7. The apparatus of claim 1 wherein a reinforcing arm extends from said stripping portion into supportive engagement with said guiding portion.

8. The apparatus of claim 1 wherein each said stripping portion includes an upper arm and a pair of side flanges extending downwardly from said upper arm toward the adjacent roller, one of said side flanges extending substantially vertically from said upper arm to a position of proximity with said adjacent roller, and the other of said side flanges extending divergently outwardly from said upper arm and then substantially vertically to another position of proximity with said adjacent roller.

9. In an apparatus for stripping leaves from a stalk including a pair of rollers connected for counter-rotating movement in side-by-side relationship to form a nip, the improvement comprising:

(a) means for guiding leaves to the nip and, in response to some leaves sticking to the rollers, for stripping the sticking leaves from the rollers;

(b) the guiding and stripping means including a bent member adjacent each roller, each of said bent members having a stripping portion extending axially along the adjacent roller in proximity therewith and substantially parallel with the nip, and a guiding portion extending divergently outwardly from the nip;

(c) each said stripping portion including an upper arm and a pair of side flanges extending downwardly from said upper arm toward the adjacent roller;

(d) one of said side flanges extending substantially vertically from said upper arm to a position of proximity with the adjacent roller; and (e) the other of said side flanges extending divergently outwardly from said upper arm and then substantially vertically to another position of proximity with the adjacent roller.

* * * * *